United States Patent [19]

Ong

[11] Patent Number: 4,501,083
[45] Date of Patent: Feb. 26, 1985

[54] METHOD FOR FORMING AND HOLDING CHEESE FISH BAIT

[76] Inventor: Robert Ong, 10964 Wellworth St., Apt. 103, Los Angeles, Calif. 90024

[21] Appl. No.: 427,889

[22] Filed: Sep. 29, 1982

[51] Int. Cl.³ .............................................. A01K 85/00
[52] U.S. Cl. .......................................... 43/4.5; 43/42
[58] Field of Search ................... 43/4.5, 42.53, 42; 426/1, 132, 515; 425/261, 117; 264/79, 271.1

[56] References Cited

U.S. PATENT DOCUMENTS

| | | | |
|---|---|---|---|
| 871,486 | 11/1907 | Debroisse | 43/42 |
| 1,291,614 | 1/1919 | Noxon | 43/44.2 |
| 1,593,904 | 7/1926 | Lasher | 426/1 |
| 1,795,238 | 3/1931 | Spence | 426/1 |
| 2,175,324 | 10/1939 | Stamp | 426/515 |
| 2,591,261 | 4/1952 | Holahan | 426/515 |
| 2,914,408 | 11/1959 | Buzard | 426/1 |
| 3,607,294 | 9/1971 | Ernstrom | 426/1 |
| 3,934,038 | 1/1976 | Kerr | 426/1 |

Primary Examiner—Gene P. Crosby
Attorney, Agent, or Firm—Poms, Smith, Lande & Rose

[57] ABSTRACT

A method and apparatus for forming and holding fish bait such as cheese or the like and for easy insertion of a fish hook therein. A flat mold member is provided with a plurality of indentations therein of generally cylindrical shape and with a generally hemispherical bottom with a vent hole therethrough communicating with the atmosphere. The indentations are sized to receive a fish hook, preferably a treble hook, therein. The cheese is spread across the mold member and into the indentations, being scraped level with the top thereof. Trapped air can escape through the vent hole. A treble hook can then be inserted into a cheese-filled indentation and then be withdrawn with the cheese adhering thereto. The vent hole allows air to re-enter so that the baited hook can be removed. A covered container is also provided for holding the mold member with the bait in the indentations for carrying in a safe manner. The bait is applied to the hooks as needed at time of use.

3 Claims, 8 Drawing Figures

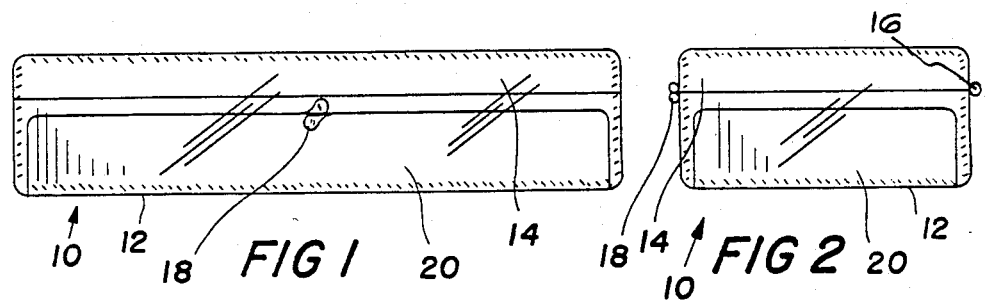
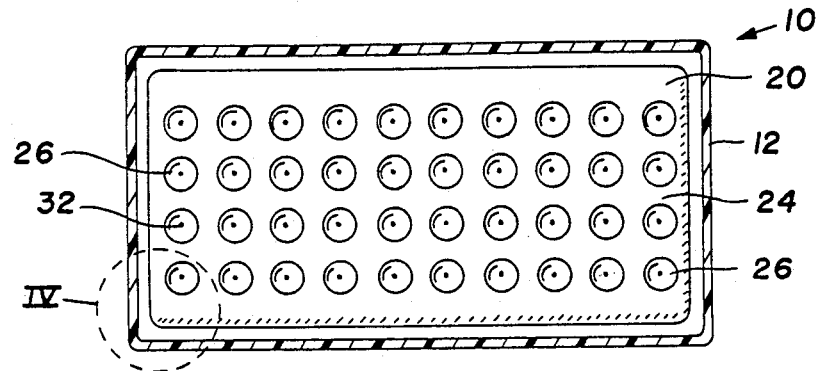
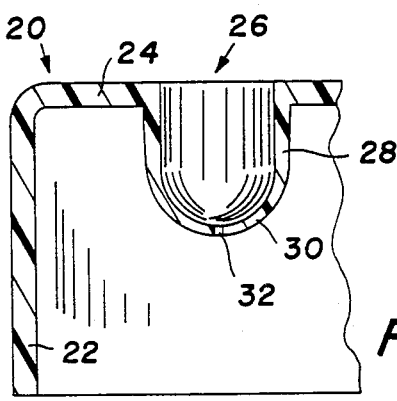
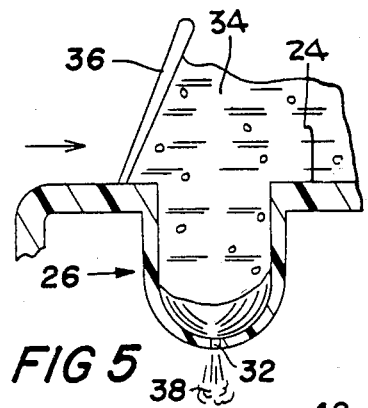
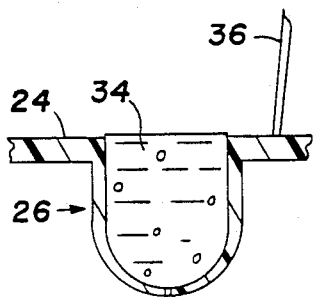
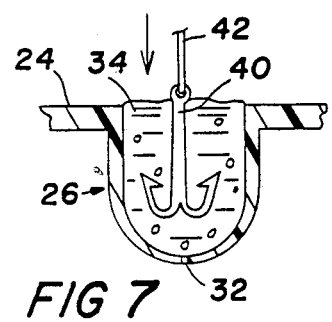
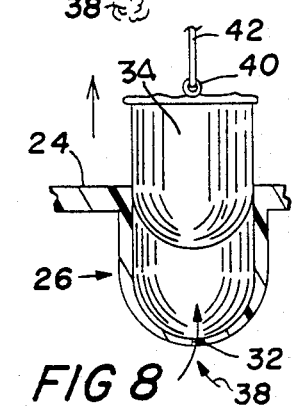

METHOD FOR FORMING AND HOLDING CHEESE FISH BAIT

BACKGROUND OF THE INVENTION

The present invention relates to fishing apparatus and, more particularly, to methods and apparatus for applying bait to hooks and for storing bait.

Bait fishing is a popular pastime. In this manner of fishing, a fish hook has bait applied thereto which is attractive to the fish by such attributes as smell, taste, and consistency. Such bait falls into two general categories—natural and artificial. Natural baits include worms, minnows, frogs, crabs, clams, and the like. Artificial baits are often used, however, because of the non-availability of natural bait, convenience, or fish preference. Materials such as marshmallows, fish, and pork rind are used by piercing them with the fish hook.

In U.S. Pat. No. 871,486, an artificial fish-like material is disclosed which is mixed, molded, allowed to set, and then pierced through by a fish hook in the manner of a natural piece of fish or pork rind.

Another whole family of artificial baits are those such as the doughs or cheeses which are mixed by the fisherman or obtained commercially in jars. Several such compositions are shown in U.S. Pat. Nos. 3,607,294; 1,795,238; 1,593,904; and 1,291,614. For simplicity, all these baits will be referred to hereinafter as "cheese" whereas, in fact, they may be any number of combinations of ingredients being of a consistency which is spreadable but not flowable, i.e., won't flow off the hook.

Typically, such cheese bait is rolled in the palm of the hand to warm it to a moldable consistency and shaped it into a ball. A treble hook is then thrust into the ball and the cheese material pressed about the treble hook. Because of the nature of the product, it is difficult to pre-bait the hooks and travel with them safely in a pre-baited condition. Consequently, the bait must be applied at the time of use in a manner which is not only inconvenient, but messy.

Wherefore, it is the object of the present invention to provide a method and apparatus for preparing cheese bait and allowing it to be safely transported for later use in a convenient and non-messy manner.

SUMMARY

The foregoing objectives have been achieved by the method of the present invention for making cheese-bait for fishing comprising the steps of providing a flat surface having a plurality of indentations therein each being of a diameter and depth adapted to receive a fish hook therein; providing a vent to atmosphere in the bottom of each indentations; mixing the cheese to a spreadable but not flowing consistency; spreading the cheese across the flat surface and into the indentations; and wiping the cheese from the flat surface and leaving it in the indentations, whereby a baited hook can be obtained at time of use by inserting a fish hook into the cheese in one of the indentations and withdrawing the fish hook in combination with the cheese.

To accomplish this method, the present invention employs a flat mold member having a plurality of indentations therein each being of a diameter and depth adapted to receive a fish hook therein and with each indentation having a hole or vent to atmosphere in the bottom thereof. Further, means for supporting the mold member are provided. In the preferred embodiment, the indentations are substantially cylindrical with hemispherical bottoms, although any taper and shape to allow bait disposed therein around a fish hook to be withdrawn therefrom without deforming would be acceptable. A container is also provided which is adapted to receive the mold member with bait in the indentations and a cover is provided for securing the mold member in the container whereby the bait can be transported safely and can be removed individually at time of use.

DESCRIPTION OF THE DRAWINGS

FIG. 1 is a front elevation of the container and mold member of the present invention nested for transportation.

FIG. 2 is a side elevation of the apparatus of FIG. 1.

FIG. 3 is a plan view of the apparatus of FIGS. 1 and 2 in a partially cut away view showing the top surface of the mold member and the indentations therein.

FIG. 4 is a cutaway, detailed side elevation of the apparatus of FIG. 3 in the area designated by IV.

FIGS. 5-8 show the apparatus of FIGS. 1-4 being used to practice the method of the present invention.

DESCRIPTION OF THE PREFERRED EMBODIMENT

In its preferred embodiment, the apparatus of the present invention comprises a mold member and a container for holding it in a protected state for transportation. In FIGS. 1-3, the container is generally indicated as 10 and comprises a base 12 having a lid 14 attached thereto by hinges 16 on one side and having a latch 18 molded into the base 12 and lid 14 for releasably holding them together. The mold member 20 is adapted to be removably inserted within the base 12 with the lid 14 closed over the base 12 with bait in the mold member 20 in the manner to be described hereinafter.

As can be seen in FIGS. 3 and 4, the mold member 20 comprises a flat top surface 24 having a plurality of indentations 26 therein. The top surface 24 is supported by side walls 22. The indentations 26 can easily be formed in the top surface 24 by many techniques well known to those skilled in the art, particularly if both the container 10 and the mold member 20 are of plastic, which is a preferred material. The indentations 26 are so shaped that they will easily release bait therefrom. In the preferred embodiment, they are substantially cylindrical with a hemispherical bottom. That is, the side walls 28 are cylindrical (with a slight taper being preferred) and the bottoms 30 are hemispherical. A narrow vent hole 32 is provided in the bottom of each bottom portion 30 in communication with the atmosphere. Air but not bait should pass through the vent hole 32.

To use the apparatus as shown in accordance with the method of the present invention, cheese bait 34 is first mixed to a spreadable but non-flowing consistency. It is then spread over the top surface of the mold member 20, which is removed from the container 10 for this purpose. A flat-bladed knife 36 is particularly useful for this purpose. The bait 34 is spread over the top surface 24 forcing it into the indentations 26, which completely fill because of the trapped air 38 therein being able to pass out through the vent holes 32. When the indentations 26 are filled with bait 34, the knife 36 is further used to scrape the excess bait 34 from the top surface 24, leaving the indentations 26 each filled with bait 34 substantially level with the top surface 24, as shown in FIG. 6. As shown in FIG. 7, at time of use, and preferably after some drying, a treble hook 40 (typically having leader 42 attached thereto) can then be thrust into a bait 34. Since the bait 34 is contained, it is automatically pressed around the hook 40 in the desired shape. As the hook 40 is withdrawn, as shown in FIG. 8, the bait 34 comes out in combination with it.

If desired, one or more of the baits 34 can have a hook 40 thrust therein following preparation of the bait 40 at home, as described, and be left there for transportation. The mold member 20 with the bait 34 and hooks 40 in place can then be placed within the container 20 and the lid 14 positioned over the bait 12 to hold all the elements safely in place during transportation. When a pre-baited hook is desired, it is simply withdrawn from an indentation 26 in the manner shown in FIG. 8. As the bait 34 and hook 40 are withdrawn (either immediately, or later) air can enter through the vent hole 32 which allows the bait/hook combination 34, 40 to be withdrawn from the indentation 26 without deforming.

This latter method of pre-baiting also has an added benefit in that between the time the hook 40 is inserted into bait 34 and the time that the bait 34 and hook 40 are withdrawn from the indentation 26, a certain amount of drying of the bait 34 will take place allowing it to be used with the expectation that it will remain longer upon the hook during casting and immersion in the water where the fishing is taking place.

Wherefore, having thus described my invention, I claim:

1. A method for making baited hooks for fishing comprising the steps of:
   (a) providing a flat surface having a plurality of indentations therein each being of a diameter and depth adapted to receive a fish hook therein;
   (b) providing a vent to atmosphere in the bottom of each said indentation;
   (c) mixing fish bait to a spreadable but non-flowing consistency;
   (d) inserting the spreadable fish bait across into said indentations;
   (e) inserting fish hooks into the fish bait in respective ones of said indentations; and,
   (f) withdrawing said fish hooks in combination with the fish bait.

2. A method for making cheese-bait for fishing comprising the steps of:
   (a) providing a flat surface having a plurality of indentations therein each being of a diameter and depth adapted to receive a fish hook therein;
   (b) providing a vent to atmosphere in the bottom of each indentation;
   (c) mixing the cheese to a spreadable but non-flowing consistency;
   (d) spreading the cheese across said flat surface and into said indentations;
   (e) wiping the cheese from said flat surface and leaving it in said indentations, whereby subsequently inserting a fish hook into the cheese in one of said indentations and withdrawing it will cause the fish hook to come out in combination with the cheese.

3. The method of claim 2 and additionally:
   allowing the cheese to particlly dry between the time of forming it and the time of applying it to a fish hook.

* * * * *